United States Patent
Thakkar et al.

(10) Patent No.: US 12,015,529 B1
(45) Date of Patent: Jun. 18, 2024

(54) PRIVATE MOBILE NETWORK HAVING NETWORK EDGES DEPLOYED ACROSS MULTIPLE SITES

(71) Applicant: Highway9 Networks, Inc., Saratoga, CA (US)

(72) Inventors: Sachin Thakkar, San Jose, CA (US); Debashis Basak, Saratoga, CA (US); Serge Maskalik, Los Gatos, CA (US); Allwyn Sequeira, Saratoga, CA (US)

(73) Assignee: Highway9 Networks, Inc., Saratoga, CA (US)

( * ) Notice: Subject to any disclaimer, the term of this patent is extended or adjusted under 35 U.S.C. 154(b) by 0 days.

(21) Appl. No.: 17/718,183

(22) Filed: Apr. 11, 2022

(51) Int. Cl.
*H04L 41/122* (2022.01)
*H04W 12/06* (2021.01)

(52) U.S. Cl.
CPC .......... *H04L 41/122* (2022.05); *H04W 12/06* (2013.01)

(58) Field of Classification Search
None
See application file for complete search history.

(56) References Cited

U.S. PATENT DOCUMENTS

| | | | |
|---|---|---|---|
| 2018/0343567 A1* | 11/2018 | Ashrafi | H04L 43/08 |
| 2020/0389843 A1* | 12/2020 | Huang | H04W 8/08 |
| 2021/0127271 A1* | 4/2021 | Wu | H04W 12/0471 |
| 2022/0030431 A1* | 1/2022 | Peylo | H04W 60/06 |
| 2022/0264469 A1* | 8/2022 | Zhu | H04W 52/0235 |
| 2022/0272043 A1* | 8/2022 | Mishra | H04L 47/60 |
| 2022/0279354 A1* | 9/2022 | Chandrappa | H04W 8/18 |
| 2022/0322221 A1* | 10/2022 | Ianev | H04W 48/18 |
| 2022/0369215 A1* | 11/2022 | Dees | H04W 76/12 |
| 2022/0369219 A1* | 11/2022 | Landais | H04W 48/18 |

OTHER PUBLICATIONS

"Private 5G: What is it? How does it work?", by Sridhar Bhaskaran, Rakuten Symphony, Mar. 15, 2022, https://www.5gtechnologyworld.com/private-5g-what-is-it-how-does-it-work/).*
ETSI TS 123 501 V16.6.0 (Oct. 2020)—5G; System architecture for the 5G System (5GS); (3GPP TS 23.501 version 16.6.0 Release 16); pp. 342-344.*

(Continued)

*Primary Examiner* — Mohamed A. Wasel
*Assistant Examiner* — Gregory P Tolchinsky
(74) *Attorney, Agent, or Firm* — Kim & Stewart LLP

(57) ABSTRACT

A private mobile network supports information technology (IT) needs of an organization of any type and size. The private mobile network may be customized and scaled to meet the changing IT needs of the organization. It provides a common virtual network fabric by which all of the disparate networks of the organization can be bridged together and across multiple locations, and may be integrated with existing IT software and hardware of the organization, even proprietary software and hardware. The private mobile network may be accessed by devices through existing access mechanisms and through a radio access network. In addition, any device accessing the private mobile network is associated with a user identifier, such as an e-mail address assigned to the user by the organization, so that the user can be identified regardless of which device was used in accessing the private mobile network.

18 Claims, 12 Drawing Sheets

(56) References Cited

OTHER PUBLICATIONS

Cheung, D. "5G Core Part 1—Architecture Overview," Apr. 7, 2020, 21 pages, Retrieved from the Internet, URL: https://derekcheung.medium.com/5g-core-pdu-session-and-qos-part-1-a12852e1b342.

Wipro Ltd. "Untrusted Non-3GPP Access Network Interworking with 5G Core," Jun. 2020, 16 pages, Retrieved from the Internet, URL: https://www.wipro.com/network-edge-providers/untrusted-non-3gpp-access-network-interworkingwith-5g-core/.

3rd Generation Partnership Project (3GPP), Technical Specification Group Services and System Aspects, System architecture for the 5G System (5GS), Stage 2, Release 17, Sep. 2021, 542 pages.

* cited by examiner

PRIVATE MOBILE NETWORK HAVING NETWORK EDGES DEPLOYED ACROSS MULTIPLE SITES

BACKGROUND

The landscape of information technology (IT) infrastructure for many companies, hospitals, educational institutions, and other organizations, especially ones with multiple offices, campuses, and/or factories around the world, has become a complex web of disparate networks that are often controlled by proprietary software and hardware of different vendors. The disparate networks are deployed to support different access mechanisms that include wired connections to a local area network (LAN) through physical ports, remote connections over the Internet through a virtual private network (VPN), and wireless connections to a wireless LAN through a Wi-Fi® controller. In recent years, the access mechanisms have further evolved to cellular connections to a mobile core network through radio units.

Further complicating the IT landscape are the different types of devices that access the disparate networks. They include a personal computer with a port for wired connection or a wireless adapter for wireless connection, and a tablet computer or a smartphone with a Wi-Fi card and a SIM (subscriber identification module) card. In recent years, devices accessing the networks have expanded to IoT (internet of things) devices, such as security cameras, sensors, usage meters, factory and hospital equipment, HVAC systems, robots, and vehicles.

In addition, the IT infrastructure is constantly changing as new software systems and solutions are added. However, new software systems and solutions typically cannot be integrated into existing networks because the existing networks rely on proprietary software and hardware and the new software systems and solutions may have unique requirements such as heightened security requirements or strict quality-of-service requirements. As a result, new software systems and solutions often require new networks to be created for them, with each such new network having its own management and operational system for applying security policies.

SUMMARY

One or more embodiments provide a private mobile network (PMN) that can be deployed to support IT needs of an organization of any type and size. The PMN according to the embodiments may be customized and scaled to meet the changing IT needs of the organization. It provides a common virtual network fabric by which all of the disparate networks of the organization can be bridged together and across multiple locations, and may be integrated with existing IT software and hardware of the organization, even proprietary software and hardware. As a result, the PMN according to the embodiments significantly reduces the complexity of the IT infrastructure.

A method of deploying a private mobile network, according to an embodiment, includes: deploying a first set of network functions onto a first virtual infrastructure at a first location, the first set of network functions including a first network function through which a data network is accessed and a second network function through which first devices at the first location connect into the private mobile network to access the data network through the first network function; and deploying a second set of network functions onto a second virtual infrastructure at a second location, the second set of network functions including a third network function through which the data network is accessed and a fourth network function through which second devices at the second location connect into the private mobile network to access the data network through the third network function.

A method of authenticating devices of a user into a private mobile network that includes a set of network functions deployed onto a virtual infrastructure is also provided. The set of network functions includes a first network function through which a data network is accessed, a second network function through which a first device of the user can connect into the private mobile network to access the data network through the first network function, and a third network function through which a second device of the user can connect into the private mobile network to access the data network through the first network function. The method, according to an embodiment, includes, upon receiving a first authentication request from a first device of the user connected into the private mobile network through the second network function: transmitting the first authentication request through the first network function to an authentication server, wherein the first authentication request includes credentials of the user; and authenticating the first device of the user into the private mobile network, upon receiving a message that the authentication server has authenticated the device in response to the first authentication request. The method further includes, upon receiving a second authentication request from the second device of the user connected into the private mobile network through the third network function: transmitting the second authentication request to a fourth network function deployed onto the virtual infrastructure, wherein the second authentication request includes identifying information of the second device; and authenticating the second device of the user into the private mobile network, upon verifying by the fourth network function an encrypted response generated by the second device of the user.

A method of establishing connectivity to data networks in a private mobile network that includes a set of network functions including first, second, and third network functions, that are deployed onto a virtual infrastructure, in response to requests made by different devices of a user, is also provided. The method, according to an embodiment, includes, after a first device of the user has been authenticated into the private mobile network through the second network function and upon receiving a first request from the first device for access to a data network: retrieving policies applicable to the user and determining whether or not access to the data network is permitted; and upon determining that the access is permitted, establishing connectivity between the first device and the data network through the first network function. The method further includes, after a second device of the user has been authenticated into the private mobile network through the third network function and upon receiving a second request from the second device for access to the data network: retrieving the policies applicable to the user and determining whether or not access to the data network is permitted; and upon determining that the access is permitted, establishing connectivity between the second device and the data network through the first network function.

Further embodiments include a non-transitory computer-readable storage medium comprising instructions that cause a computer system to carry out the above method, as well as a computer system configured to carry out the above method.

DETAILED DESCRIPTION

Figure 1:
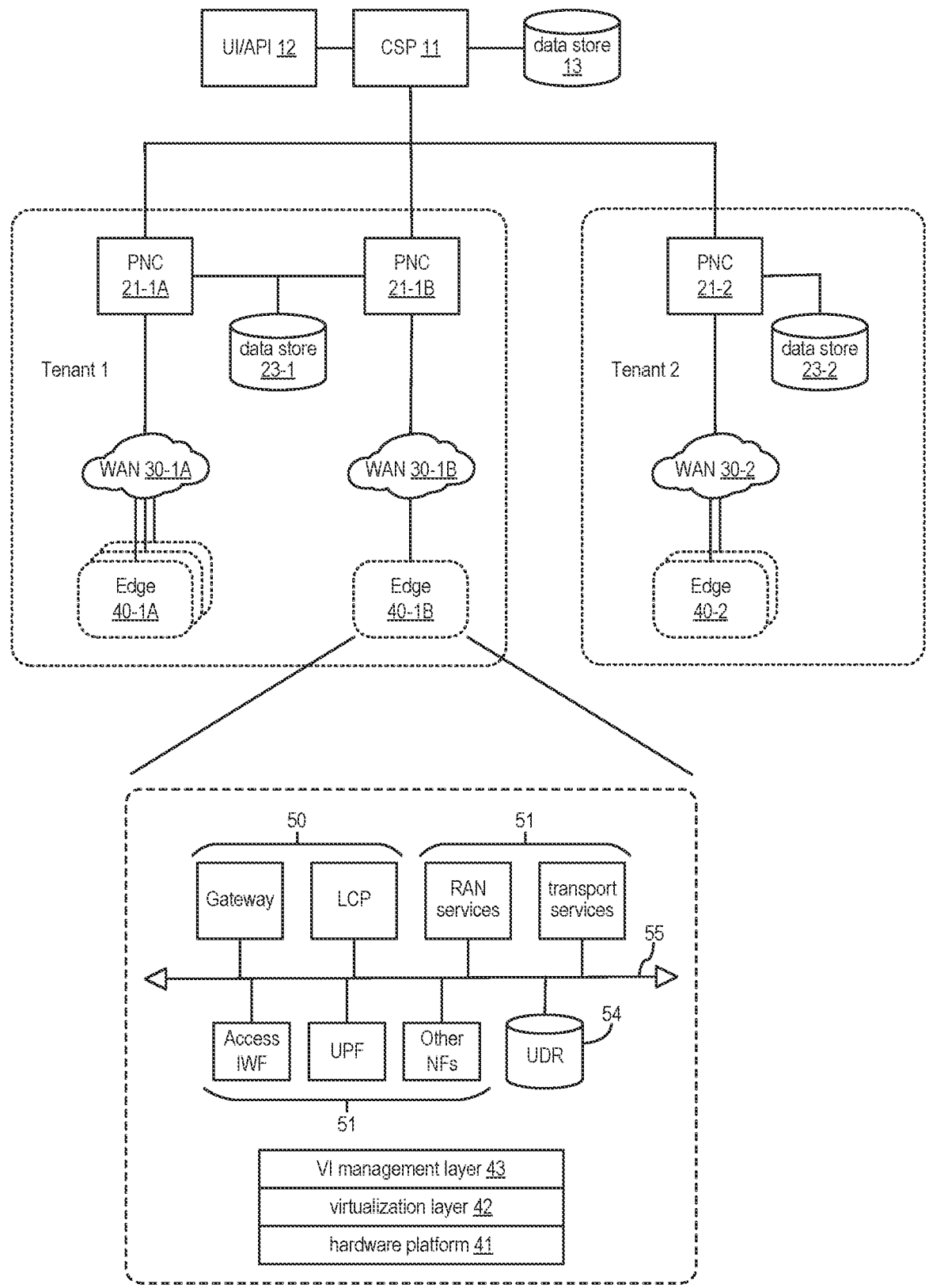
FIG. 1 is a block diagram that illustrates private mobile networks deployed from a cloud services platform, according to embodiments.

FIG. 1 is a block diagram that illustrates private mobile networks deployed from a cloud services platform (CSP) 11, according to embodiments. In one embodiment, CSP 11 is a multi-tenant portal implemented in a public cloud and accessed by administrators of the different organizations (also referred to herein as tenants or customers) to deploy one or more PMNs for their respective organizations. In other embodiments, CSP 11 is implemented in a private data center for a particular organization and accessed by an administrator of that organization to deploy one or more PMNs for that organization.

CSP 11 presents the PMN as a service through a user interface (UI) or application programming interfaces (APIs), which is depicted in FIG. 1 as UI/API 12. As such, the PMN may be purchased on a subscription basis. The APIs enable other businesses to integrate their platforms with CSP 11 and present the PMN as a service to their customers on their platforms.

A persistent storage device for CSP 11, depicted as data store 13, stores a manifest file for deploying the PMN and tenant-specified deployment information (e.g., location information) that are used in rolling out the service, and also tenant profiles and other information that are needed for metering and billing.

One or more PMN instances may be created for a tenant through CSP 11. FIG. 1 illustrates two PMN instances created for a first tenant, Tenant 1, and one PMN instance created for a second tenant, Tenant 2. Each of the PMN instances includes a private network controller (PNC) and one or more network edges (hereinafter referred to as "edges" for short), which include a set of virtual machines and containers deployed on a virtual infrastructure.

In the example of FIG. 1, two PMN instances of Tenant 1 and one PMN instance of Tenant 2 are depicted. The first PMN instance of Tenant 1 includes PNC 21-1A and a set of edges 40-1A that are connected through a wide area network (WAN) 30-1A, and the second PMN instance of Tenant 1 includes PNC 21-1B and one edge 40-1B that are connected through WAN 30-1B. The PMN instance of Tenant 2 includes PNC 21-2 and a set of edges 40-2 that are connected through a WAN 30-2. In the embodiments, the WAN may be a software-defined WAN (SD-WAN), a private WAN, or the Internet.

A persistent storage device may be provisioned for each tenant as depicted in FIG. 1 (data store 23-1 for Tenant 1 and data store 23-2 for Tenant 2) or, alternatively, separately for each PNC. Data stores 23-1 and 23-2 store management and configuration data of the edges that are controlled by the respective PNCs. Data store 23-2 stores management and configuration data of the edges that are controlled by PNC 21-2.

The PNCs may be deployed in a private data center or in a public cloud. Similarly, the edges may be deployed in a private data center or in a public cloud. The locations of the PNC and the edges are specified by the tenant when requesting the service. The PNCs each manage the lifecycle of its edge, and the number of edges and their locations may be specified/changed by the tenant through the PNCs. To enable such functionality, each PNC has a UI or exposes APIs that may be accessed/called by the administrator of a particular tenant to add or remove edges and to specify or change their locations in response to load conditions on the PMN, for example, increasing the number of edges at a particular location in response to an overload condition of the PMN at that location. Accordingly, there may be multiple edges deployed at a particular location to improve throughput. In addition, there may be multiple edges deployed to match different network zones that are defined for the organization. In such a case, an edge is deployed for each of the network zones that are configured for engineering, finance, IoT devices, and guests, respectively.

The UI/API of the PNCs enable the administrators to manage the day-to-day operations of the PMN without going through CSP 11. Accordingly, even if CSP 11 is down, the PMN can still be managed. The day-to-day operations include ordering new edges as well as removing edges, configuring new devices (such as radio units) to access the PMN, updating subscriber and SIM card information, and updating policies.

The edges are deployed on a virtual infrastructure which is provisioned in a private data center or a public cloud. The virtual infrastructure includes virtual compute, network, and storage resources and is provisioned from hardware resources. In FIG. 1, the virtual infrastructure of edge 40-1B is depicted as a representative example.

The virtual resources of edge 40-1B include virtual machines (VMs) 50, containers 51, a virtual disk 54, and a virtualized network 55 that interconnects VMs 50, containers 51, and virtual disk 54. These virtual resources are provisioned from hardware resources of hardware platform 41, which includes a plurality of physical host computers, storage devices, and network devices such as switches and routers that interconnect the physical host computers and the storage devices. Host computers may be constructed on a server grade hardware platform, such as an x86 architecture platform, that includes one or more central processing units, dynamic and static random access memory, one or more network interface controllers, and one or more storage interfaces connected to local storage or a shared storage array.

Virtualization layer 42 includes hypervisors installed in the host computers and virtualization management software which cooperates with the hypervisors to provision virtual compute, network, and storage resources from the hardware resources. Virtualized infrastructure management (VIM)

layer 43 includes software executed in a physical or virtual server to partition the virtual compute, network, and storage resources provisioned by virtualization layer 42 into different network zones, e.g., for different tenants in the example where the edge is provisioned in a public cloud.

In the representative edge of FIG. 1, a gateway VM provides connectivity to a wide area network, such as WAN 30-1B. A local control plane (LCP) VM is responsible for reporting activity at the edge and pulling down relevant configuration and policies for the edge from the PNC. The LCP VM also consumes APIs exposed by VIM layer 43 to deploy containers 51 for the edge in response to commands from the PNC. Services running in the edge such as RAN services, transport services, and network functions, such as non-3GPP (3rd Generation Partnership Project) interworking function (referred to herein as Access IWF), user plane function (UPF), and others, are provisioned by a container orchestration platform, such as Kubernetes®, as containers 51, e.g., cloud-native network functions (CNFs), as depicted in FIG. 1. Alternatively, any of the services may be deployed in individual VMs. A unified data repository (UDR) is a database that stores subscription and policy information and is provisioned in virtual disk 54.

In the embodiment illustrated herein, 5G network functions are implemented in the edge to provide edge services for the PMN. However, in other embodiments, 4G network functions may be implemented in the edge to provide services for the PMN. In addition, some of the control plane functions may be implemented in the PNC. Similarly, the UDR may be provisioned in the data store of the PNC. In general, the lifecycle of the network functions, including where they are to be deployed, centrally in the PNC or at the edge, is managed by the PNC, according to tenant preferences and also network usage patterns and load conditions.

Figure 2:
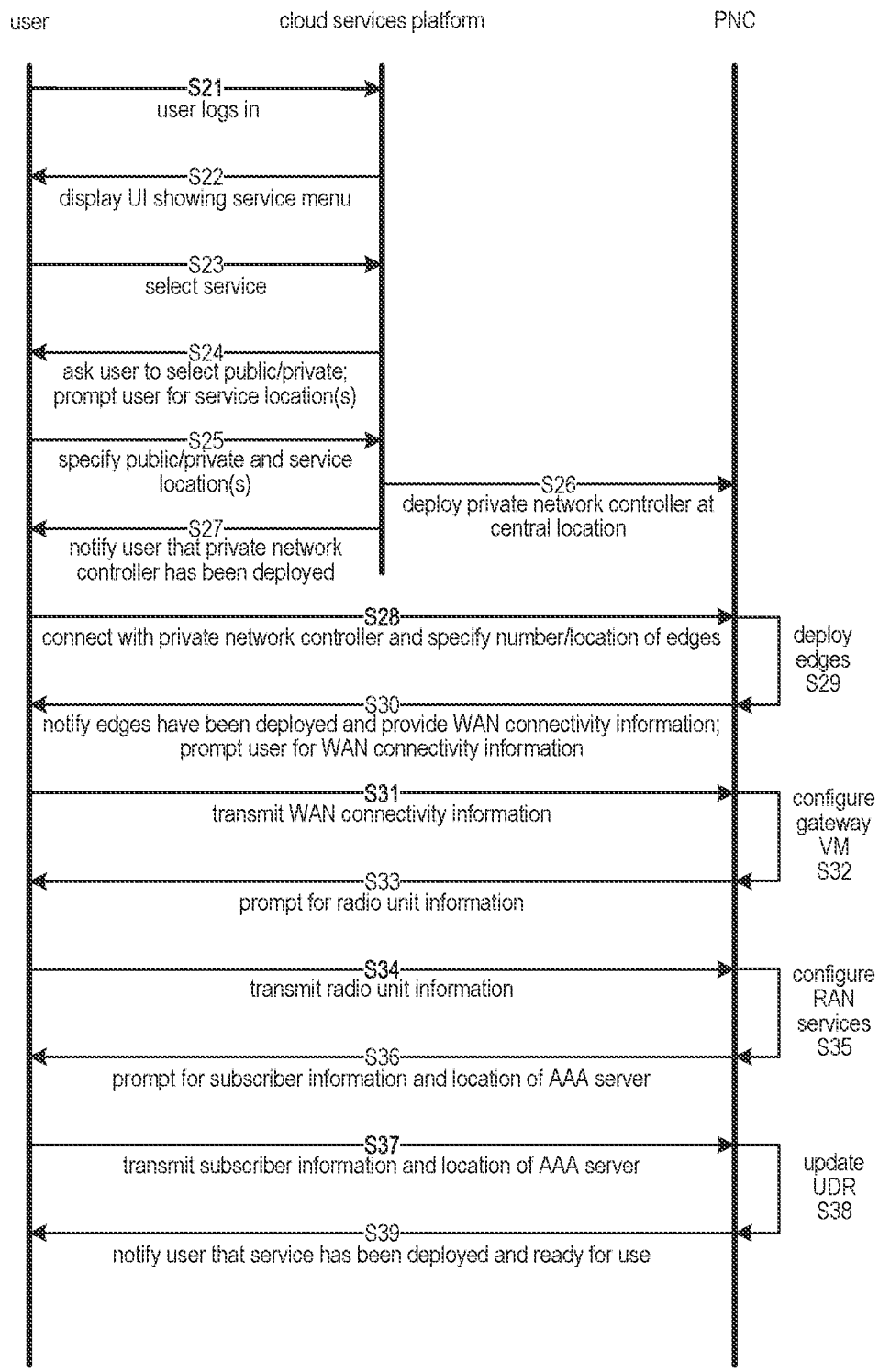
FIG. 2 is a sequence diagram that illustrates a sequence of actions carried out to provision a PMN according to embodiments.

FIG. 2 is a sequence diagram that illustrates a sequence of actions carried out to provision a PMN according to embodiments. The process of provisioning a PMN begins at step S21 when an administrator for a tenant (hereinafter referred to as a user) logs in to CSP 11. In response, CSP 11 at step S22 renders a user interface that includes a menu of services for selection, including a PMN service. When the user selects the PMN service at step S23, CSP 11 at step S24 prompts the user to select the method of deployment between public and private and to also specify the locations at which the PMN service will be provided. The information returned by the user at step S25 is used by CSP 11 to select the best location for provisioning the PNC for the PMN. At step S26, CSP 11 deploys the PNC at a location that is central to the service locations. If the deployment is public, the deployment location of the PNC is a public cloud located centrally to the service locations. If the deployment is private, the deployment location of the PNC is a private data center of the tenant that is located centrally to the service locations. Upon completion of the deployment, CSP 11 notifies the user at step S27 that the PNC has been deployed at the central location, and redirects the user to be connected with the PNC.

At step S28, the user connects with the PNC and specifies one or more locations of the edges to be deployed for the PMN, the number of edges at each specified location, and whether the edges are to be interconnected or disparate. In response, the PNC at step S29 deploys the edges near the specified locations. For example, if the deployment is public, the deployment location of each edge is a public cloud located near the specified service location, and if the deployment is private, the deployment location of each edge is a private data center of the tenant that is located near the specified location. For the deployment of each edge, the PNC first provisions a gateway VM and an LCP VM from the virtual infrastructure and then communicates with the LCP VM through the gateway VM to deploy the containers for network functions. In one embodiment, VM images and container images for the network functions may be downloaded from an image repository that is maintained by CSP 11 and provided to the tenant as part of the PMN service.

After the edges have been deployed, the PNC at step S30 notifies the user that the edges have been deployed and provides the user with connectivity information to its gateway VM, and also prompts the user for connectivity information to WAN devices through which the user will connect into the PMN. The connectivity information to the gateway VM is needed for the user to reconfigure any of its WAN devices which route egress and ingress traffic of data transmitted and received through network access devices, such as Wi-Fi controllers, LAN controllers, and VPN concentrators. Similarly, the connectivity information to the WAN devices is needed to configure the gateway VM that will receive traffic from and send traffic to the WAN devices. Upon receipt of the connectivity information to the WAN devices transmitted by the user at step S31, the PNC at step S32 configures its gateway VM using the connectivity information received from the user. In the embodiments where the edges are deployed in public clouds, the communication path between the WAN devices and the edges are not secure. Therefore, as part of step S32, the PNC instructs transport services, e.g., through API calls, to establish a secure channel, e.g., IPsec tunnel, between the WAN devices and the gateway VM. Similarly, the PNC instructs transport services to establish a secure channel, e.g., IPsec tunnel, between the PNC and the gateway VM, through which sensitive data, such as subscriber information and policy data, will be exchanged.

Radio access into the PMN from mobile devices is also possible. The mobile devices may be mobile phones or IoT devices capable of cellular communication. In the embodiments described herein, mobile devices that are equipped with a SIM (subscriber identity module) card or a USIM (universal subscriber identity module) card (both of which are referred to herein as SIM card) are permitted to access the PMN so long as the IMSI (international mobile subscriber identity) number associated with the SIM card and an encryption key associated with the SIM card are registered with the PMN.

To enable radio access, new radio units need to be set up near the edges and network functions at the edge need to be configured for communication with the radio units. In addition to setting up new radio units, existing radio units that have already been deployed near the edge may be used for radio access. These radio units may be radio units owned by the user's organization or radio units owned by a third party and made available for lease. In either case, the network functions at the edge need to be configured for communication with such radio units.

Thus, at step S33, the PNC prompts the user for information on the radio units through which the PMN will be accessed. The information that is needed for configuration includes the radio ID, its location, its operating frequency, and other parameters that are needed to authenticate the radio units into the PMN. The user returns this information at step S34 and in response the PNC configures its RAN services with this information at step S35. In situations where a radio unit has a corresponding element management systems (EMS), the radio unit is configured and managed through its EMS.

After step S35 is completed, the PMN is set up and may be accessed by various devices through different access mechanisms, including radio, Wi-Fi, LAN ports, and VPN. Steps S36, S37, and S38 are carried out to collect information that is used during the process of authenticating devices into the PMN. In the embodiments, the devices that are authenticated into the PMN may be mobile devices equipped with SIM cards which connect into the network by radio, and other devices which connected into the network by other access mechanisms, such as Wi-Fi, LAN ports, and VPN. The mobile devices equipped with SIM card are referred to herein generally as 3GPP devices, and other devices are referred to herein as non-3GPP devices. At step S36, the PNC prompts the user for subscriber information for 3GPP devices. The subscriber information for each 3GPP device includes the IMSI number of the SIM card installed in the 3GPP device and another identifier associated with the 3GPP device. For a 3GPP device that is operated by a member of the of the organization, e.g., an employee, this other identifier is the member's e-mail address. For a 3GPP device that is an IoT device, this other identifier is the device's MAC address. The PNC at step S36 also prompts the user for the location (e.g., URL) of an AAA (authentication, authorization, and accounting) server, also known in the art as a RADIUS server, of the organization. The AAA server manages a database that identifies members (e.g., by their e-mail addresses) and IoT devices (e.g., by their MAC addresses) that are permitted to access the organization's network, and authorization information for each of the members and devices. The authorization information for members includes permissions or roles assigned to the members, and the authorization information for devices includes permissions assigned to the devices. A permission is the right to access one or more system objects, such as data networks that can be accessed through the PMN. A role is a group of permissions. Roles can be assigned to any member or a group of members.

The user provides the subscriber information and the location of the AAA server to the PNC at step S37. Then, in response, at step S38, the PNC updates its UDR to add the subscriber information. At step S38, in addition to updating the UDR with the information provided at step S37, the PNC acquires an encryption key associated with each of the IMSI numbers from a SIM card management server of the tenant and updates the UDR to store the encryption keys in association with the IMSI numbers. After updating the UDR, the PNC at step S39 notifies the user that the PMN has been deployed and ready for use.

In the embodiments, the 3GPP devices may operate with a conventional SIM card or an embedded SIM card. The conventional SIM card is a physical SIM card that is physically inserted into a 3GPP device. It is associated with an IMSI number and contains an encryption key. For each such conventional SIM card issued, the tenant keeps track of the IMSI number and the encryption key associated therewith in its SIM card management server. The embedded SIM card is different from the conventional SIM card in that the embedded SIM card does not have an IMSI number and an encryption key statically assigned thereto. Instead, it is dynamically assigned an IMSI number and an encryption key when it reads an activation code (e.g., QR code), which triggers a download of the IMSI number and the encryption key from the SIM card management server of the tenant. As with the conventional SIM card, the tenant keeps track of the IMSI number and the encryption key associated with each such dynamically assigned IMSI number and encryption key.

Figure 3:
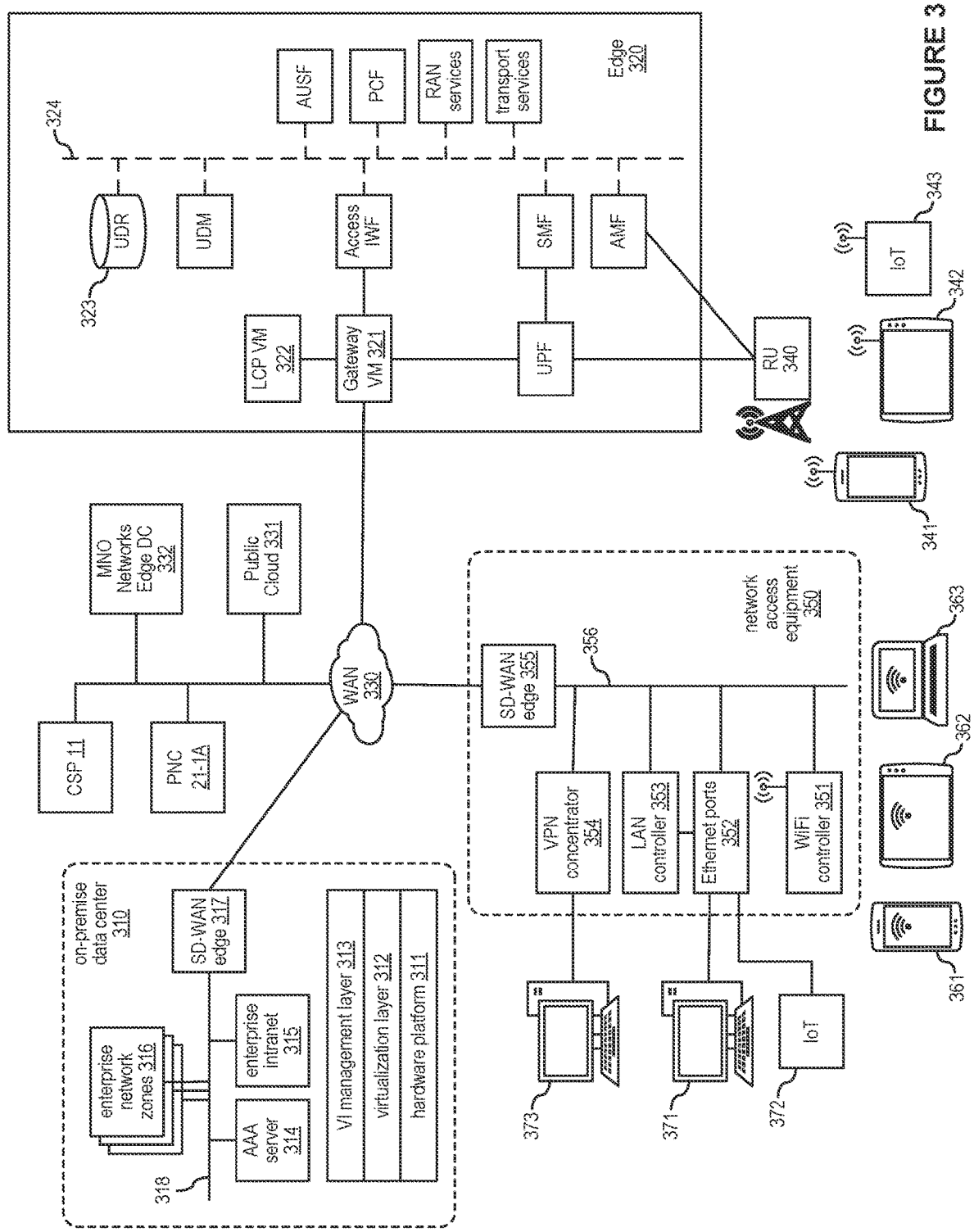
FIG. 3 is a block diagram that illustrates a PMN integrated into existing hardware of a campus for access by different devices.

FIG. 3 is a block diagram that illustrates a private mobile network integrated into existing hardware of an enterprise campus for access by different devices. In FIG. 3, the enterprise campus is depicted as a representative example to which embodiments may be applied. However, embodiments are also applicable to offices, schools, factories, and hospitals.

The enterprise campus depicted in FIG. 3 includes an on-premise data center 310, which is a private data center of the enterprise, and edge 320 that are connected over a WAN 330. In one embodiment, WAN 330 is the Internet. In another embodiment, WAN 330 is a software-defined WAN (SD-WAN) between endpoints of the SD-WAN, such as between on-premise data center 310 and edge 320.

On-premise data center 310 includes virtual infrastructure, including virtual compute, network, and storage resources, that is provisioned from hardware resources of hardware platform 311, which includes a plurality of physical host computers, storage devices, and network devices such as switches and routers that interconnect the physical host computers and the storage devices. Virtualization layer 312 includes hypervisors installed in the host computers and virtualization management software which cooperates with the hypervisors to provision the virtual compute, network, and storage resources from the hardware resources. VIM layer 313 includes software executed in a physical or virtual server to partition the virtual compute, network, and storage resources provisioned by virtualization layer 312 into virtual servers (e.g., AAA server 314 and servers for the enterprise intranet 315), and different enterprise network zones 316 for serving different groups within the enterprise, such as engineering, finance, IOT devices, and guests, all of which are connected together through a virtualized network 318. In addition, an SD-WAN edge VM 317 is provisioned at the ingress/egress point of the virtualized network 318 to control traffic coming into and going out of virtualized network 318.

Edge 320 is the part of the PMN that has been deployed for the enterprise and located near or within the enterprise campus. In one embodiment, edge 320 is deployed in a public cloud that is located near (in some cases, within) the enterprise campus. In another embodiment, edge 320 is deployed in on-premise data center 310. Edge 320 includes a gateway VM 321 that provides connectivity to WAN 330, and an LCP VM 322 that is responsible for reporting activity at the edge and pulling down relevant configuration and policies for the edge from its corresponding PNC (depicted in FIG. 3 as PNC 21-1A). As described above, LCP VM 322 also consumes APIs exposed by VIM layer (not shown) to deploy containers for the edge that are executing the services and network functions depicted in FIG. 3. The services include RAN services and transport services, and the network functions include Access IWF (described above), user plane function (UPF), access and mobility management function (AMF), session management function (SMF), unified data management (UDM), policy control function (PCF), and authentication server function (AUSF). The UDR database that stores subscription and policy information is provisioned in virtual disk 323. All of the services, the network functions (excluding the UPF), and the UDR database communicate with each other over a service-based interface (SBI) 324, which is depicted in dashed lines.

The UPF is the network function for packet processing (e.g., packet routing and forwarding) through which user plane connectivity is provided between a user equipment, e.g., one of the devices accessing the PMN, and a specific data network (DN). In example of FIG. 3, a data network may be any one of enterprise intranet 315, enterprise network zones 316, public cloud 331, and edge data center 332 of mobile network operator (MNO) networks. The device access to the PMN may be through radio unit 340 by any one of devices equipped with a SIM card, including a smartphone 341, a tablet computer 342, and an IOT device 343. The device access to the PMN may be through network access equipment 350 such as Wi-Fi controller 351 (by mobile devices equipped with a Wi-Fi adapter such as smartphone 361, tablet computer 362, and desktop computer 363), Ethernet ports 352 and LAN controller 353 (by desktop computer 371 or IOT device 372, each plugged into one of Ethernet ports 352), and VPN concentrator 354 (by a remote computer 373). Network access equipment 350 further includes SD-WAN edge 355 provisioned at the ingress/egress point of a physical network 356 that interconnects the different access mechanisms (hereinafter referred to as non-3GPP access mechanisms).

In the PMN, the user plane connectivity is managed as sessions, known in the art as protocol data unit (PDU) sessions, by the SMF. The SMF is responsible for establishing, modifying, and releasing PDU sessions for authenticated users according to policies that are managed by the PCF. The authentication process for devices connecting into the PMN through radio unit 340 is described below in conjunction with FIG. 4 and involves the AMF, AUSF, and the UDM. The authentication process for devices connecting into the PMN through non-3GPP access mechanisms is described below in conjunction with FIG. 5 and involves the Access IWF, the UPF, the PNC, and the AAA server. The establishment of the PDU sessions for authenticated devices by the SMF according to policies that are managed by the PCF is described below in conjunction with FIGS. 7 and 8.

Figure 4:
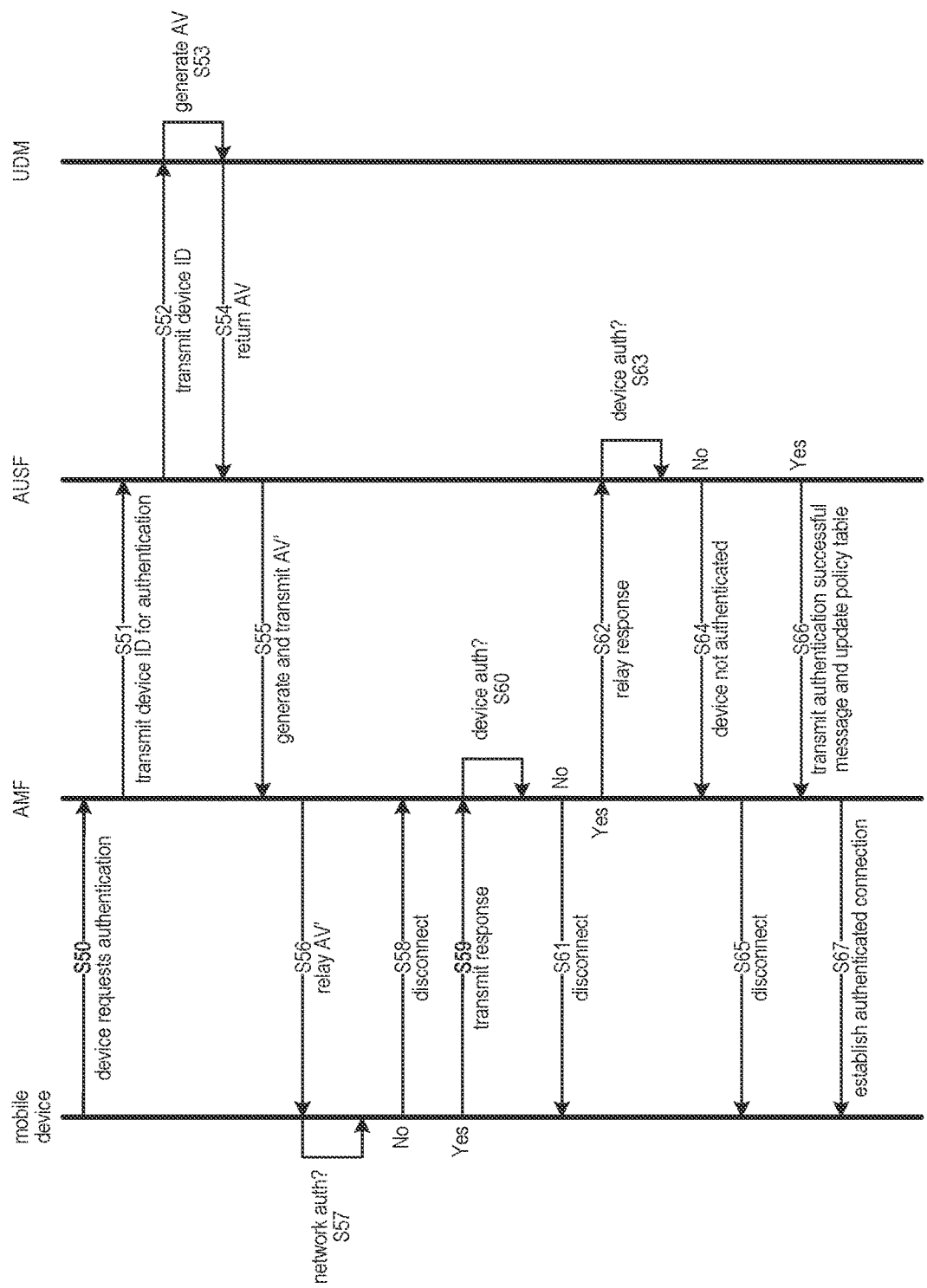
FIG. 4 is a sequence diagram that illustrates a sequence of actions carried out to authenticate a mobile device into the PMN.

FIG. 4 is a sequence diagram that illustrates a sequence of actions carried out to authenticate a mobile device connecting into the PMN through radio unit 340. In the embodiments, any of the known authentication methods may be employed, including those that rely on the 802.1x standard as the authentication mechanism over LAN or a wireless LAN, and one of several protocols that extend the 802.1x authentication mechanism, known in the art as EAP (Extensible Authentication Protocol). The authentication method depicted in FIG. 4 is for mobile devices with SIM cards and such mobiles devices are authenticated into the PMN so long as the IMSI number of the SIM card and the encryption key associated with the SIM card have been registered with the PMN, e.g., during steps S36-S38 of the process depicted in FIG. 2.

The authentication begins at step S50 with a request for authentication made by the mobile device which initially connected into a default network of the PMN through radio unit 340. The request includes the IMSI number of the mobile device (also referred to herein more generally as "device identifier") and is received by the AMF. The request arrives at the AMF and the AMF at step S51 transmits the device identifier to the AUSF. Then, at step S52, the AUSF transmits the device identifier to the UDM, which has access to the UDR, in which the subscriber information is stored. The UDM retrieves an encryption key associated with the device identifier it received from the AUSF and at step S53 generates a random number, a sequence number, and an authentication vector AV. The authentication vector AV includes the random number, an expected response (which is generated based on the random number and the encryption key), and an authentication token (which is generated based on the sequence number, the random number, and the encryption key). The authentication vector AV is transmitted from the UDM to the AUSF at step S54. Then, at step S55, the AUSF generates a hash of the expected response and transmits an authentication vector AV' including the random number, the hashed expected response, and the authentication token to the AMF, which relays the authentication vector AV' to the mobile device at step S56.

In response to receiving the authentication vector AV' from the AMF, the mobile device generates two values based on an encryption key stored in its SIM card. The first value is compared with a comparison value derived from the authentication token that is included in the authentication vector AV' to authenticate the network that it is connected to at step S57. The second value is a response that is transmitted to the AMF and the AUSF and used by the AMF and the AUSF to authenticate the mobile device. If the mobile device at step S57 determines that the first value does not match the comparison value, the mobile device determines that the network is not authenticated and disconnects from the network at step S58. On the other hand, if the mobile device at step S57 determines that the first value matches the comparison value, the mobile device determines that the network is authenticated and transmits the response to the AMF and the AUSF at step S59.

The AMF at step S60, upon receiving the response from the mobile device, calculates a hash of the response and compares the hashed response with the hashed expected response it received from the AUSF at step S55. If the two do not match, authentication fails and the AMF disconnects the mobile device from the network at step S61. If the two match, the AMF authenticates the mobile device and at step S62 passes on the response from the mobile device onto the AUSF for further authentication.

The AUSF at step S63, upon receiving the response from the AMF, compares the response with the expected response it received from the UDM at step S54. If the two do not match, authentication fails and the AUSF at step S64 notifies the AMF that the authentication failed, and the AMF at step S65 disconnects the mobile device from the network. On the other hand, if the response and the expected response match, the AUSF determines that the authentication is successful and notifies the AMF at step S66 that the mobile device has been authenticated. Then, at step S67, the AMF establishes the authenticated connection with the mobile device.

Further, at step S66, upon determining that the authentication is successful, the AUSF instructs LCP VM to update the policy information maintained in UDR. In response, the LCP VM calls transport services to create an IPsec channel over the Internet and through this IPsec channel requests PNC to deliver policy information for the authenticated device. The request includes the e-mail address or the MAC address associated with the authenticated device. In response, PNC passes on the request to the AAA server, which returns the requested policy information to the PNC. The PNC then delivers the policy information to the LCP VM over the IPsec channel, and the LCP VM updates the policy information in the UDR.

Figure 5:
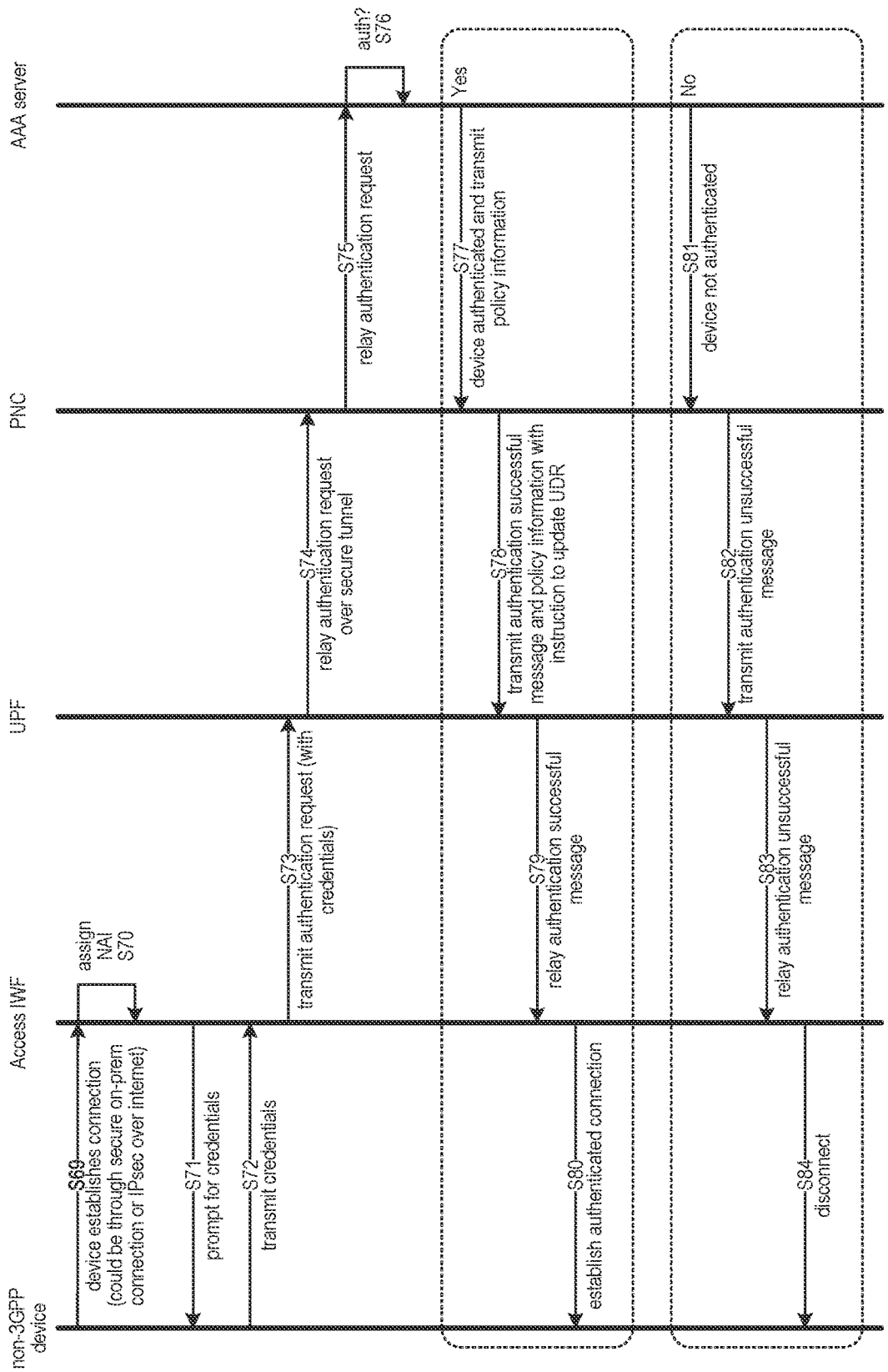
FIG. 5 is a sequence diagram that illustrates a sequence of actions carried out to authenticate a non-3GPP device into the PMN.

FIG. 5 is a sequence diagram that illustrates a sequence of actions carried out to authenticate a non-3GPP device into the PMN. In the embodiments, any of the known authentication methods may be employed, including those that rely on the 802.1x standard as the authentication mechanism over LAN or a wireless LAN, and one of several protocols of EAP. The authentication method depicted in FIG. 5 is for non-3GPP devices, e.g., devices connecting into the PMN through the Access IWF.

The authentication begins at step S69 when the device initially connects into a default network of the PMN through the Access IWF. For edges deployed in a private data center, the connection between the device and the Access IWF is over dedicated private lines. However, for edges deployed in a public cloud, the connection between the device and the Access IWF is a secure channel (e.g., IPsec) that is established by the transport services.

Upon detecting the connection into the default network, the Access IWF assigns a network access identifier (NAI) to the device at step S70. Then, the Access IWF prompts the device for credentials at step S71, and receives them from the device at step S71. In one embodiment, the credentials are encrypted with a public key published by the AAA server, such encrypted credentials being decrypted at the AAA server by the private key associated with the public key and stored at the AAA server. In other embodiments, the credentials are unencrypted. The credentials are user ID and password for users who are logging in from their respective computing devices and a MAC address for IOT devices. Other examples of credentials that can be used for authentication are certificates, one-time passwords, and smart cards.

At step S73, the Access IWF transmits a request to authenticate the device associated with the NAI assigned at step S70, the request including the credentials transmitted at step S72. The request is transmitted to the UPF which, at step S74, relays it over a secure tunnel established between the UPF and the PNC by the transport services. The PNC then relays the authentication request with the credentials to the AAA server at step S75.

The AAA server performs the authentication of the device associated with the NAI at step S76 based on the credentials received. If the credentials are encrypted, the AAA server decrypts the credentials using its private key. The authentication involves checking to see if the received credentials match the credentials stored in the AAA server for authorized users and authorized devices. If the received credentials match the credentials of a person (e.g., a member of the organization), the device from which the credentials were provided and associated with the NAI assigned at step S70 is authenticated. If the received credentials match the credentials of a device (e.g., an IoT device), the device from which the credentials were provided and associated with the NAI assigned at step S70 is authenticated. If the received credentials do not match any of the credentials stored in the AAA server, the device is not authenticated.

At step S77, the AAA server notifies the PNC of successful device authentication. In addition to the notification, the AAA server transmits the policy information for the authenticated device to the PNC. In the case where the authenticated device is a device operated by a person (e.g., a member of the organization), the policy information for the authenticated device includes information about data networks that the person has permission to access. In the case where the authenticated device is an IoT device, the policy information for the authenticated device includes information about data networks that the device has permission to access. Then, the PNC at step S78 transmits a message to the UPF that the device authentication was successful, and also transmits the policy information to the UPF with an instruction for the LCM VM to update the UDR with the transmitted policy information.

At step S79, the UPF relays the message that the device authentication was successful to the Access IWF and the instruction to update the UDR with the transmitted policy information to the LCP VM. Then, the Access IWF, upon receipt of the message from the UPF, establishes the authenticated connection with the device (step S80), and the LCP VM, upon receipt of the instruction from the UPF, updates the UDR with the transmitted policy information (not shown).

Steps S81-S84 are carried out if device authentication is unsuccessful. At step S81, the AAA server notifies the PNC that the device cannot be authenticated. Then, at step S82, the PNC transmits a message to the UPF that the device authentication was unsuccessful. The UPF at step S83 relays the message to the Access IWF, and the Access IWF in response to this message disconnects the device from the network (step S84).

Figure 6A:
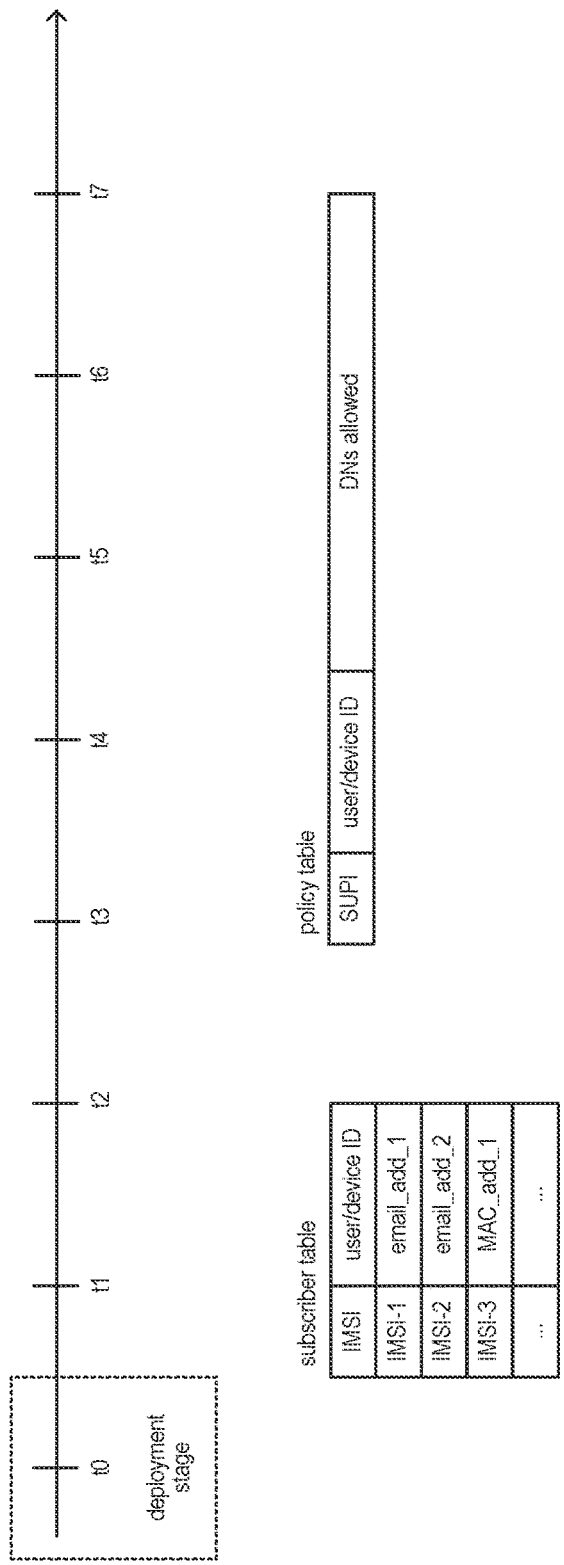
FIGS. 6A-6E are timing diagrams that illustrate how devices authenticated into the PMN are associated with policies of the organization.

FIGS. 6A-6E are timing diagrams that illustrate how devices authenticated into the private mobile network are associated with policies of the organization. Two tables, a subscriber table and a policy table, both of which are maintained in the database stored in the UDR, are shown in FIGS. 6A-6E underneath a time scale that depicts different points in time during the beginning part of the lifecycle of a PMN starting with its deployment at time t0. The subscriber table includes entries for all of the 3GPP devices that have been registered into the PMN during deployment, e.g., during steps S36-S38 of the process depicted in FIG. 2. The subscriber table is updated when the user registers additional 3GPP devices through the UI/API of the PNC. The policy table includes entries for all devices that have been authenticated into the PMN. The policy table is updated as devices are authenticated into the PMN. Therefore, as shown in FIG. 6A, at time t0, which represents the deployment stage, the policy table has no entries.

As devices are authenticated into the PMN over time, the policy table is updated with entries for the authenticated devices. The entries of these authenticated devices are indexed into the policy table according to their subscriber permanent identifiers (SUPIs), which in the case of 3GPP devices correspond to the IMSI numbers of the SIM cards installed in the devices, and in the case of non-3GPP devices correspond the NAI numbers assigned to the devices (e.g., at step S70 of FIG. 5). Each entry in the policy table has a user/device ID attribute and one or more policy attributes. The user/device ID attributes corresponds to the e-mail addresses (in the case of person-operated devices) or MAC addresses (in the case of IoT devices) associated with the device. The policy attributes correspond to the policies that are applicable to this device. These policies are stored in the AAA server in association with the user/device ID and downloaded into the policy table at the time devices are authenticated into the network and corresponding entries for the devices are created in the policy table. The example of a policy attribute given in FIGS. 6A-6E is labeled "DNs allowed." This policy attribute lists the names of data networks that the authenticated device is allowed to access.

Figure 6B:
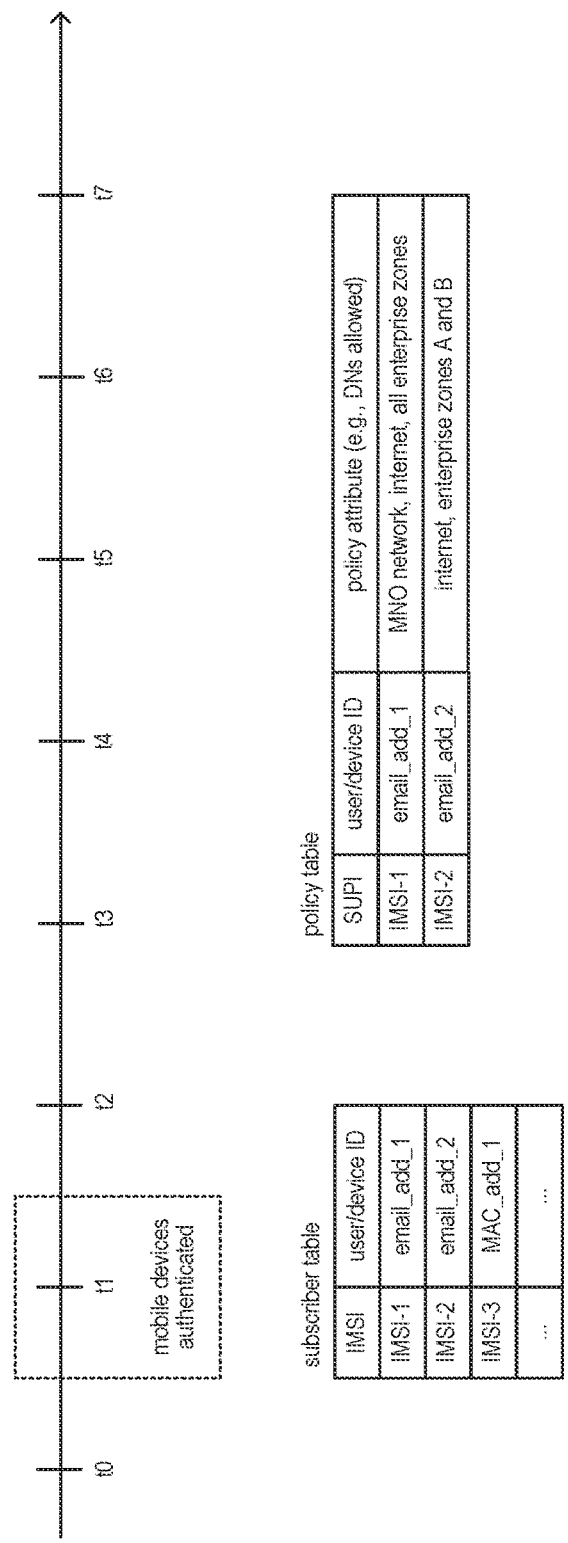

At time t1, two 3GPP devices, which are person-operated 3GPP devices, are authenticated into the PMN. Therefore, as shown in FIG. 6B, the entries for these devices are added to the policy table. The SUPI for the first entry is the IMSI number of the SIM card installed in the device, depicted as IMSI-1. The user/device ID for the first entry is the e-mail address associated with the device in the subscriber table, depicted as email_add_1. The policy attribute for the first entry lists the MNO network, the internet, and all enterprises zones, as the data networks that the authenticated device is allowed to access. This policy attribute is retrieved at step S66 of FIG. 4.

Similarly, the SUPI for the second entry is the IMSI number of the SIM card installed in the device, depicted as IMSI-2. The user/device ID for the second entry is the e-mail address associated with the device in the subscriber table, depicted as email_add_2. The policy attribute for the second entry lists the internet and all enterprise zones, as the data networks that the authenticated device is allowed to access. This policy attribute is retrieved at step S66 of FIG. 4.

Figure 6C:
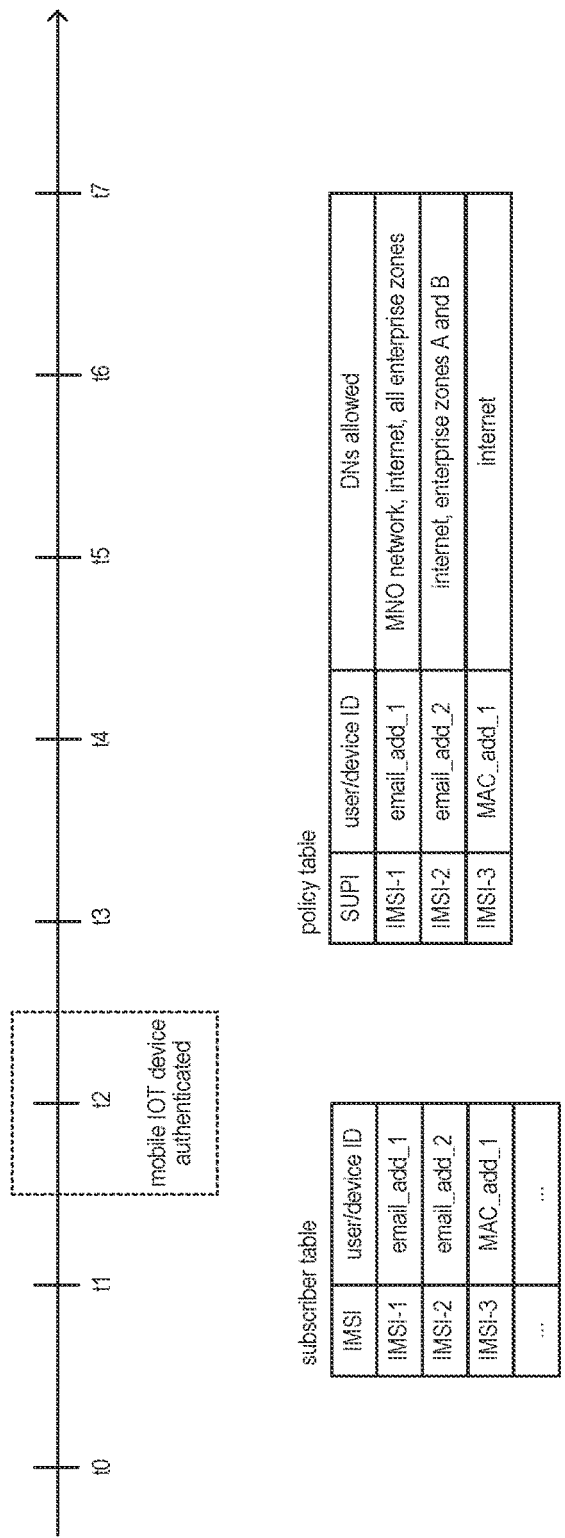

At time t2, another 3GPP device, which is an IoT device, is authenticated into the PMN. Therefore, as shown in FIG. 6C, the entry for this IoT device is added to the policy table. The SUPI for this entry is the IMSI number of the SIM card installed in the IoT device, IMSI-3. The user/device ID for this entry is the MAC address of the IoT device, MAC add 1. The policy attribute for this entry lists the internet as the data network that the authenticated device is allowed to access. This policy attribute is retrieved at step S66 of FIG. 4.

Figure 6D:
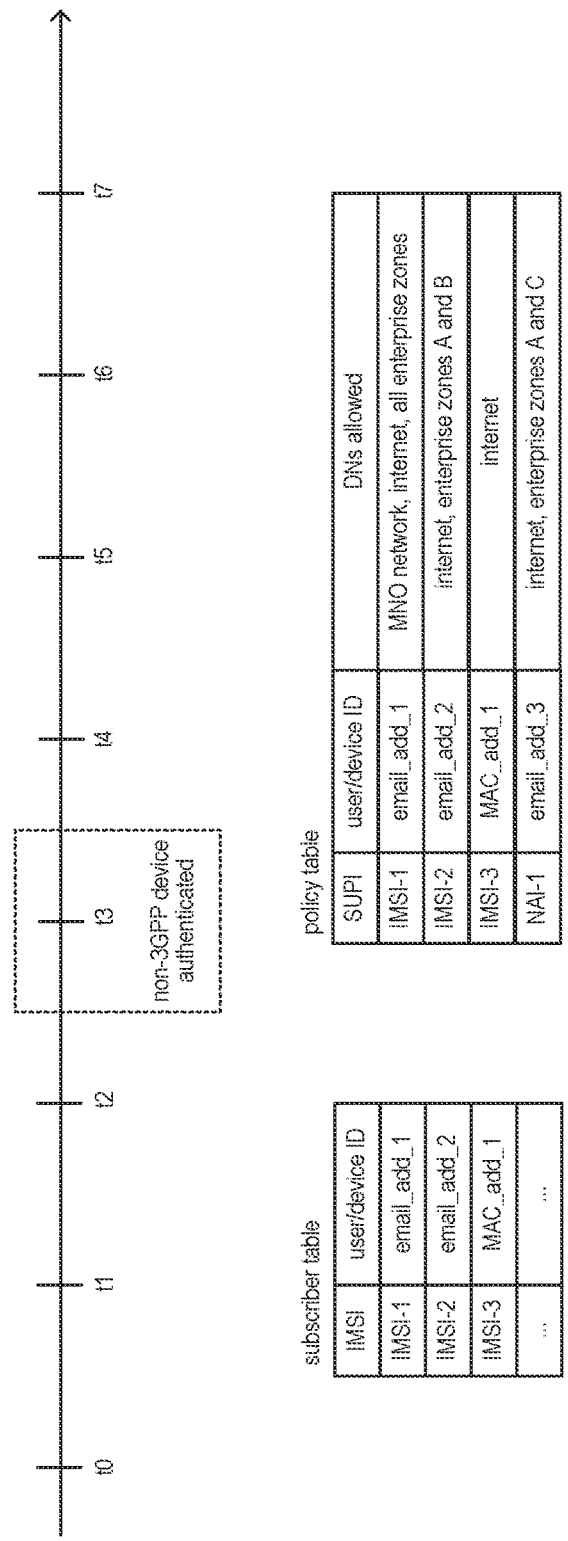

At time t3, a non-3GPP device, which is a person-operated non-3GPP device, is authenticated into the PMN. Therefore, as shown in FIG. 6D, the entry for this non-3GPP device is added to the policy table. The SUPI for this entry is the NAI assigned to this device at step S70 of FIG. 5, NAI-1. The user/device ID for this entry is the e-mail address corresponding to the credentials that have been authenticated by the AAA server in step S76, email_add_3. The policy attribute for this entry lists the internet, enterprise zone A, and enterprise zone C as the data networks that the authenticated device is allowed to access. This policy attribute is provided by the AAA server at step S77 of FIG. 5.

Figure 6E:
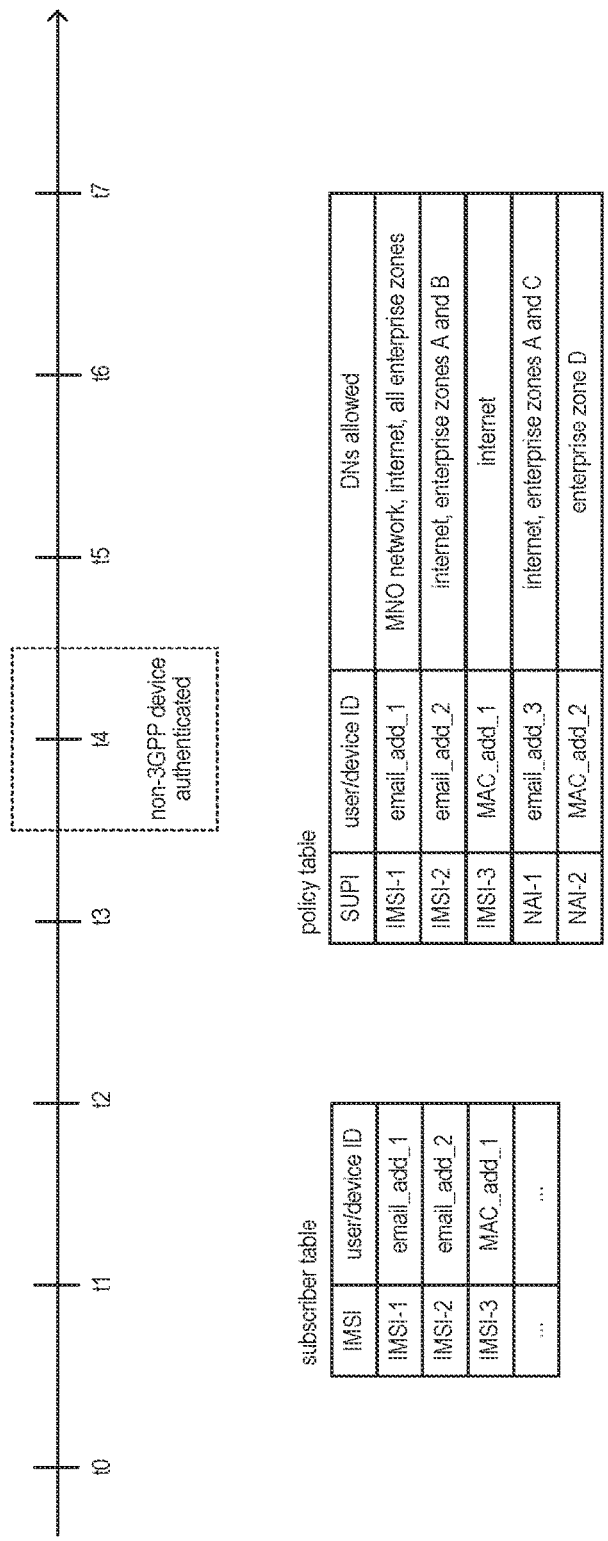

At time t4, a non-3GPP device, which is a non-3GPP IoT device, is authenticated into the PMN. Therefore, as shown in FIG. 6E, the entry for this IoT device is added to the policy table. The SUPI for this entry is the NAI assigned to this device at step S70 of FIG. 5, NAI-2. The user/device ID for this entry is the MAC address corresponding to the credentials that have been authenticated by the AAA server in step S76. The policy attribute for this entry lists enterprise zone D as the data network that the authenticated device is allowed to access. This policy attribute is provided by the AAA server at step S77 of FIG. 5.

Figure 7:
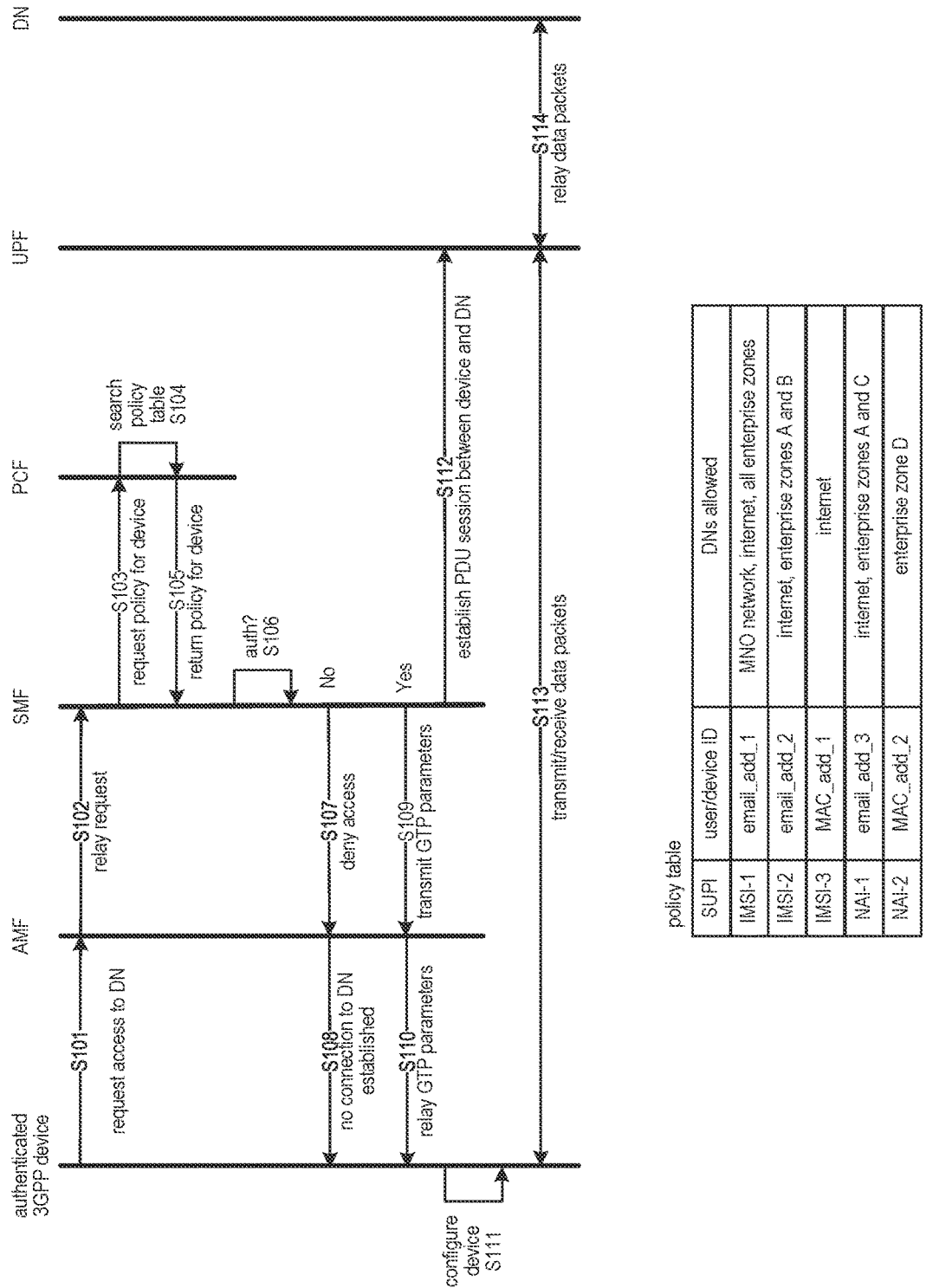
FIG. 7 is a sequence diagram that illustrates a sequence of actions carried out to permit a 3GPP device to access a logical network of the PMN.
Figure 8:
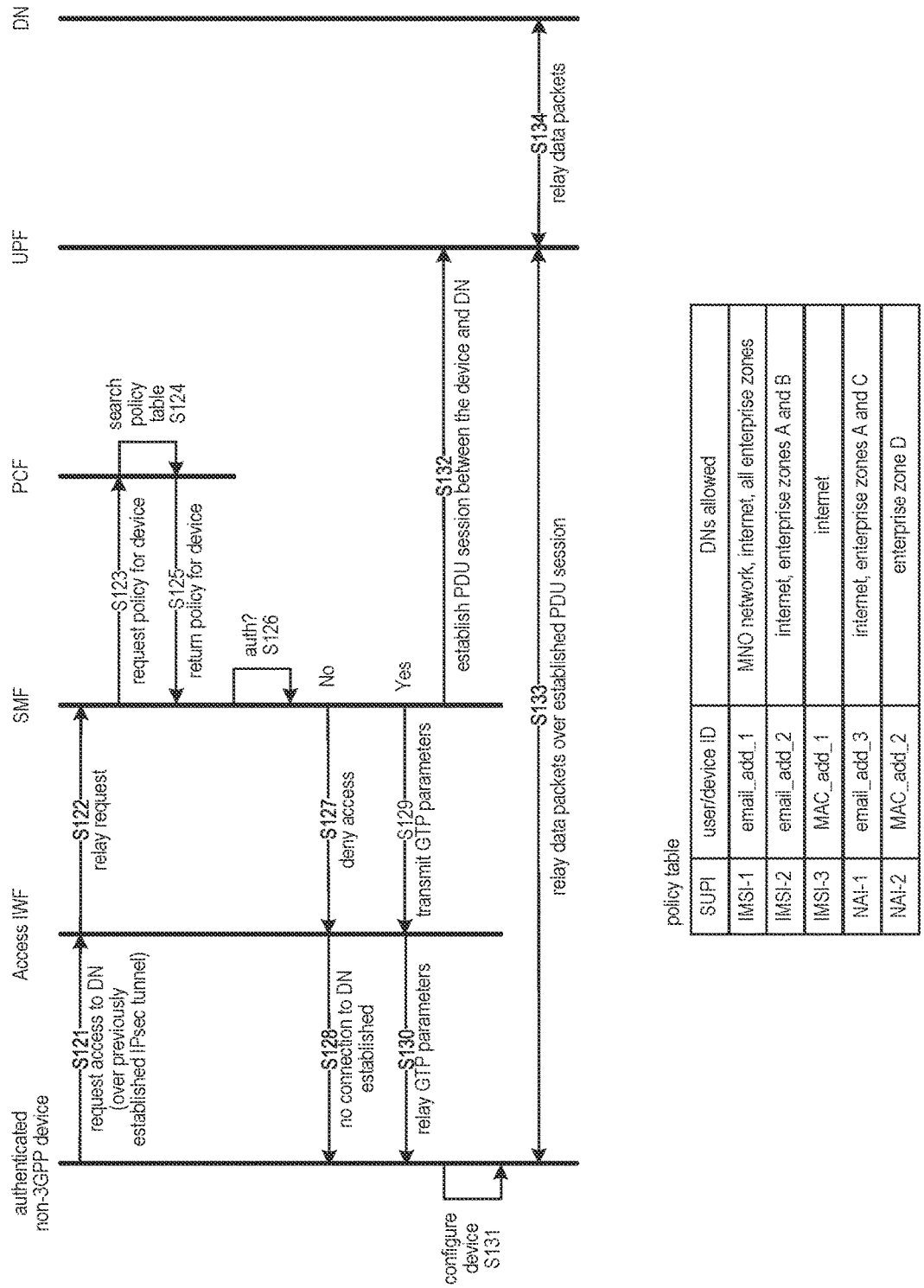
FIG. 8 is a sequence diagram that illustrates a sequence of actions carried out to permit a non-3GPP device to access a logical network of the PMN.

FIGS. 7-8 are sequence diagrams that illustrate a sequence of actions carried out to permit authenticated devices to access a logical network of the PMN. A logical network is a network that is created to connect an authenticated device to one of the data networks through the edge, in particular through the UPF. FIG. 7 illustrates an example of creating a logical network for an authenticated 3GPP device. FIG. 8 illustrates an example of creating a logical network for an authenticated non-3GPP device. In both examples, policies specified in the policy table shown in FIG. 6E are applied to determine whether or not the logical network can be created.

In the example of FIG. 7, the request to access a particular data network is made by the authenticated 3GPP device through the AMF at step S101, which relays the request to the SMF at step S102. The request may be made by the authenticated 3GPP device when an application is launched in the device and the application requires connection to the particular data network.

At step S103, the SMF requests the PCF for the policy attributes associated with the device. The request includes the SUPI for the device. The PCF at step S104 searches the policy table for the list of allowed data networks associated with the SUPI and returns the list to the SMF at step S105. Then, at step S106, the SMF determines whether or not the particular data network requested is listed (and thus authorized to be accessed by the device).

If not authorized, the SMF notifies the AMF that the device access to the requested data network is denied at step S107, and no connection from the device to the data network is established at step S108. On the other hand, if the access to the requested data network by the device is authorized, the SMF transmits GTP (GPRS Tunneling Protocol) parameters to the AMF at step S109 (along with a message that the requested access is authorized) and the AMF relays the GTP parameters to the device at step S110.

The GTP parameters are used to configure the device as an endpoint of the GTP tunnel that extends to the UPF at step S111. In addition, the SMF at step S112 configures the UPF as the other end point of the GTP tunnel and establishes a PDU session between the device and the requested data network through the UPF. After the GTP tunnel and the PDU session are established, the device begins transmitting data packets to and receiving data packets from the data network at step S113 and the UPF relays the data packets to and from the data network at step S114.

In the example of FIG. 8, the request to access a particular data network is made by the authenticated non-3GPP device through the Access IWF at step S121, which relays the request to the SMF at step S122. The request may be made by the authenticated non-3GPP device when an application is launched in the device and the application requires connection to the particular data network.

At step S123, the SMF requests the PCF for the policy attributes associated with the device. The request includes the SUPI for the device. The PCF at step S124 searches the policy table for the list of allowed data networks associated with the SUPI and returns the list to the SMF at step S125. Then, at step S126, the SMF then determines whether or not the particular data network requested is listed (and thus authorized to be accessed by the device).

If not authorized, the SMF notifies the Access IWF that the device access to the requested data network is denied at step S127, and no connection from the device to the data network is established at step S128. On the other hand, if the access to the requested data network by the device is authorized, the SMF transmits GTP parameters to the Access IWF at step S129 (along with a message that the requested access is authorized) and the Access IWF relays the GTP parameters to the device at step S130.

The GTP parameters are used to configure the device as an endpoint of the GTP tunnel that extends to the UPF at step S131. In addition, the SMF at step S132 configures the UPF as the other end point of the GTP tunnel and establishes a PDU session between the device and the requested data network through the UPF. After the GTP tunnel and the PDU session are established, the device begins transmitting data packets to and receiving data packets from the data network at step S133 and the UPF relays the data packets to and from the data network at step S134.

The embodiments described herein may employ various computer-implemented operations involving data stored in computer systems. For example, these operations may require physical manipulation of physical quantities. Usually, though not necessarily, these quantities may take the form of electrical or magnetic signals, where the quantities or representations of the quantities can be stored, transferred, combined, compared, or otherwise manipulated. Such manipulations are often referred to in terms such as producing, identifying, determining, or comparing. Any operations described herein that form part of one or more embodiments may be useful machine operations.

One or more embodiments of the invention also relate to a device or an apparatus for performing these operations. The apparatus may be specially constructed for required purposes, or the apparatus may be a general-purpose computer selectively activated or configured by a computer program stored in the computer. Various general-purpose machines may be used with computer programs written in accordance with the teachings herein, or it may be more convenient to construct a more specialized apparatus to perform the required operations.

The embodiments described herein may be practiced with other computer system configurations including hand-held devices, microprocessor systems, microprocessor-based or programmable consumer electronics, minicomputers, mainframe computers, etc.

One or more embodiments of the present invention may be implemented as one or more computer programs or as one or more computer program modules embodied in computer readable media. The term computer readable medium refers to any data storage device that can store data which can thereafter be input to a computer system. Computer readable media may be based on any existing or subsequently developed technology that embodies computer programs in a manner that enables a computer to read the programs. Examples of computer readable media are hard drives, NAS systems, read-only memory (ROM), RAM, compact disks (CDs), digital versatile disks (DVDs), magnetic tapes, and other optical and non-optical data storage devices. A computer readable medium can also be distributed over a network-coupled computer system so that the computer readable code is stored and executed in a distributed fashion.

Although one or more embodiments of the present invention have been described in some detail for clarity of understanding, certain changes may be made within the scope of the claims. Accordingly, the described embodiments are to be considered as illustrative and not restrictive, and the scope of the claims is not to be limited to details given herein but may be modified within the scope and equivalents of the claims. In the claims, elements and/or steps do not imply any particular order of operation unless explicitly stated in the claims.

Virtualization systems in accordance with the various embodiments may be implemented as hosted embodiments, non-hosted embodiments, or as embodiments that blur distinctions between the two. Furthermore, various virtualization operations may be wholly or partially implemented in hardware. For example, a hardware implementation may employ a look-up table for modification of storage access requests to secure non-disk data.

Many variations, additions, and improvements are possible, regardless of the degree of virtualization. The virtualization software can therefore include components of a host, console, or guest OS that perform virtualization functions.

Plural instances may be provided for components, operations, or structures described herein as a single instance. Boundaries between components, operations, and data stores are somewhat arbitrary, and particular operations are illustrated in the context of specific illustrative configurations. Other allocations of functionality are envisioned and may fall within the scope of the invention. In general, structures and functionalities presented as separate components in exemplary configurations may be implemented as a combined structure or component. Similarly, structures and functionalities presented as a single component may be implemented as separate components. These and other variations, additions, and improvements may fall within the scope of the appended claims.

What is claimed is:

1. A method of deploying a private mobile network and authenticating devices into the private mobile network, the method comprising:

deploying, in response to a selection of a service made by a user through a multi-tenant cloud services portal, a first set of network functions onto a first virtual infrastructure at a first location that is selected by the user, the first set of network functions including a first user plane function (UPF) through which data networks are accessed and including a first session management function (SMF);

authenticating a first device at the first location into the private mobile network and retrieving a list of first data networks that the first device is permitted to access via the private mobile network;

establishing by the first SMF, a connection that is between the first device and one of the listed first data networks and that is through the first UPF;

deploying, in response to the selection of the service, a second set of network functions onto a second virtual infrastructure at a second location that is selected by the user, the second set of network functions including a second UPF through which data networks are accessed and including a second SMF;

authenticating a second device at the second location into the private mobile network and retrieving a list of second data networks that the second device is permitted to access via the private mobile network; and establishing by the second SMF, a connection that is between the second device and one of the listed second data networks and that is through the second UPF.

2. The method of claim 1, further comprising:

configuring a first access and mobility management function (AMF), which is one of the network functions of the first set, to communicate with a first radio access network at the first location, to enable a third device at the first location to connect into the private mobile network through the first radio access network to access one of a list of third data networks through the first UPF; and configuring a second AMF, which is one of the network functions of the second set, to communicate with a second radio access network at the second location, to enable a fourth device at the second location to connect into the private mobile network through the second radio access network to access one of a list of fourth data networks through the second UPF.

3. The method of claim 2, further comprising:

establishing first and second secure channels, wherein access to the ones of the listed first and third data networks by the first and third devices is controlled based on access control information for the ones of the listed first and third data networks, respectively, transmitted through the first secure channel, and wherein access to the ones of the listed second and fourth data networks by the second and fourth devices is controlled based on access control information for the ones of the listed second and fourth data networks, respectively, transmitted through the second secure channel.

4. The method of claim 2, wherein the first and second devices connecting into the private mobile network are authenticated by an authentication server for the private mobile network based on information transmitted to the authentication server through the first and second UPFs.

5. The method of claim 2, wherein each of the third and fourth devices connecting into the private mobile network is authenticated using a cryptographic key associated with the respective one of the third and fourth devices.

6. The method of claim 5, wherein a first authentication server function (AUSF) of the network functions of the first set is configured to perform the authentication of the third device, and a second AUSF of the network functions of the second set is configured to perform the authentication of the fourth device.

7. The method of claim 1, wherein the first location is geographically near a first campus of the user, and the second location is geographically near a second campus of the user.

8. The method of claim 1, wherein the first location and second location are private data centers of the user.

9. The method of claim 1, wherein the first location and second location are public cloud computing platforms.

10. The method of claim 1, wherein the ones of the listed first and second data networks are each one of a plurality of data networks including an Internet, an intranet of the user, networks of mobile network operators, and private data networks of the user.

11. The method of claim 1, wherein the private mobile network is a mobile network that is private to an organization and is configured to retrieve the list of first data networks and the list of second data networks from an authentication server of the organization.

12. A computer system supporting a private mobile network, the computer system comprising:
a first hardware platform that is at a first location selected by a user, the first hardware platform being configured to use one or more first central processing units (CPUs) and first memory to execute first virtual infrastructure, wherein a first set of network functions is deployed onto the first virtual infrastructure in response to a selection of a service made by the user through a multi-tenant cloud services portal, the first set of network functions including a first user plane function (UPF) through which data networks are accessed and a first session management function (SMF), and wherein the first hardware platform is further configured to use the one or more first CPUs and the first memory to:
authenticate a first device at the first location into the private mobile network and retrieve a list of first data networks that the first device is permitted to access via the private mobile network; and
establish by the first SMF, a connection that is between the first device and one of the listed first data networks and that is through the first UPF; and
a second hardware platform that is at a second location selected by the user, the second hardware platform being configured to use one or more second CPUs and second memory to execute second virtual infrastructure, wherein a second set of network functions is deployed onto the second virtual infrastructure in response to the selection of the service, the second set of network functions including a second UPF through which data networks are accessed and a second SMF, and wherein the second hardware platform is further configured to use the one or more second CPUs and the second memory to:
authenticate a second device at the second location into the private mobile network and retrieve a list of second data networks that the second device is permitted to access via the private mobile network; and
establish by the second SMF, a connection that is between the second device and one of the listed second data networks and that is through the second UPF.

13. The computer system of claim 12, wherein
the first set of network functions further includes a first access and mobility management function (AMF) configured to communicate with a first radio access network at the first location, to enable a third device at the first location to connect into the private mobile network through the first radio access network to access one of a list of third data networks through the first UPF, and
the second set of network functions further includes a second AMF configured to communicate with a second radio access network at the second location, to enable a fourth device at the second location to connect into the private mobile network through the second radio access network to access one of a list of fourth data networks through the second UPF.

14. The computer system of claim 13, further comprising:
a network controller that communicates with the first set of network functions and the second set of network functions over first and second secure channels, respectively,
wherein access to the ones of the listed first and third data networks by the first and third devices is controlled based on access control information for the ones of the listed first and third data networks, respectively, transmitted through the first secure channel, and
wherein access to the ones of the listed second and fourth data networks by the second and fourth devices is controlled based on access control information for the ones of the listed second and fourth data networks, respectively, transmitted through the second secure channel.

15. The computer system of claim 14, wherein
the first and second devices connecting into the private mobile network are authenticated by an authentication server for the private mobile network based on information transmitted to the authentication server through the first and second UPFs, the network controller, and the first and second secure channels, and
each of the third and fourth devices connecting into the private mobile network is authenticated using a cryptographic key associated with the respective one of the third and fourth devices.

16. The computer system of claim 14, wherein the network controller is deployed in a public cloud computing platform, and the first location and second location are private data centers of the user.

17. The computer system of claim 14, wherein the network controller is deployed in a public cloud computing platform, and the first location and second location are public cloud computing platforms.

18. The computer system of claim 12, wherein the ones of the listed first and second data networks are each one of a plurality of data networks including an Internet, an intranet of the user, networks of mobile network operators, and private data networks of the user.

* * * * *